ð

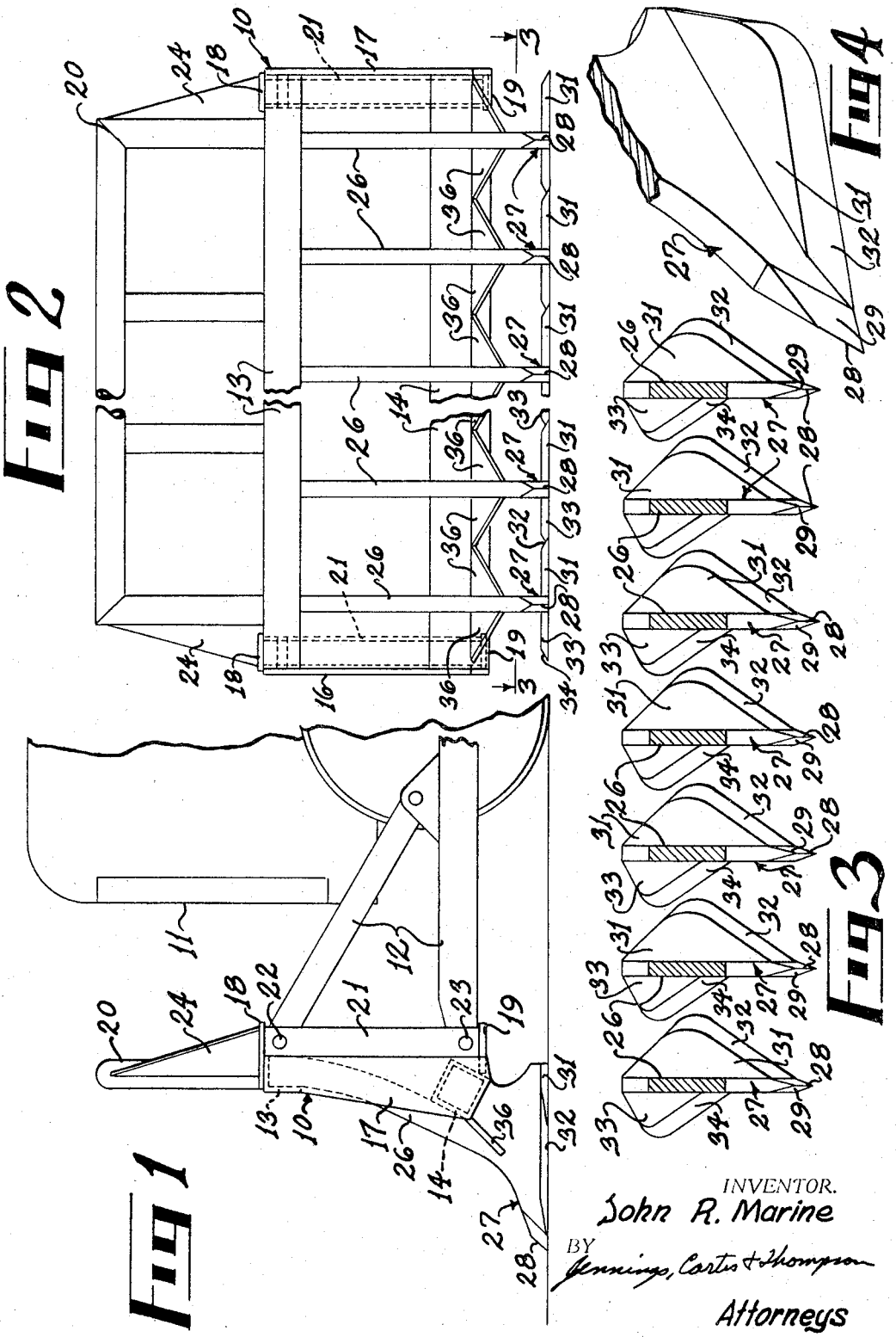

United States Patent Office 3,424,211
Patented Jan. 28, 1969

3,424,211
LAND CLEARING IMPLEMENT
John R. Marine, Panola, Ala. 35477
Filed Oct. 20, 1965, Ser. No. 498,903
U.S. Cl. 144—34　　　　2 Claims
Int. Cl. A01g 23/06

ABSTRACT OF THE DISCLOSURE

Land clearing implement having a plurality of laterally spaced splitter elements with shear blades at opposite sides thereof and inwardly extending forwardly and inwardly with one shear blade terminating adjacent the forward end of the splitter element and the other shear blade terminating rearwardly of the forward end of said one shear blade with shear blades of adjacent splitter elements overlapping each other as viewed in the direction of travel.

---

This invention relates to a land clearing implement and more particularly to such an implement which shall be adapted to cut and rake small growth after the larger growth has been removed by land clearing apparatus, such as is disclosed in my Patent No. 3,119,421, dated Jan. 28, 1964.

Another object of my invention is to provide a land clearing implement of the character designated in which all small growth and the remains of larger growth are completely removed from the area covered by the implement, thus eliminating the necessity of having to bring hand labor into the field to complete the clearing operation.

A further object of my invention is to provide a land clearing implement of the character designated which shall include horizontal shear blades which are in overlapping relationship with each other, as viewed in the direction of travel, so that an object engaged by one shear blade is directed into engagement with the other shear blade whereby the smallest growth is engaged by at least one of the shear blades prior to being raked forward by the implement.

A further object of my invention is to provide a land clearing implement of the character designated which shall include a plurality of laterally spaced splitter elements having shear blades at opposite sides thereof, whereby the implement is adapted to split, cut and remove any stumps and the like which are left by the heavier land clearing implement, which is intended to remove all of the larger growth.

A still further object of my invention is to provide land clearing apparatus of character designated which shall be extremely simple of construction, economical of manufacture, and one which is particularly adapted for mounting adjacent the forward end of conventional type tractors.

As is well known in the art to which my invention relates, it is very difficult to clear up small growth materials, due to the fact that such growth is often scattered, whereby it is necessary to hunt out the growth and then remove the same by hand labor. Not only does this consume a great amount of labor and time, but all of the small growth materials are not removed since it is often difficult to locate the same, especially where the materials are partially covered by soil.

With my present invention, I provide a land clearing implement which includes a plurality of forwardly extending splitter elements which are spaced laterally from each other. Shear blades are mounted adjacent opposite sides of each splitter element in overlapping relationship to each other as viewed in the direction of travel, whereby all growth, regardless of size, is engaged by at least one of the shear blades, whereupon it is cut and removed. Also, one shear blades extends forwardly of the other and terminates adjacent the splitting element, whereby the entire area over which the implement passes is cleared of both large and small growth with one pass of the implement, thus eliminating the necessity of having to cut and remove the small growth by hand labor after the larger growth has been removed.

Apparatus embodying features of my invention is illustrated in the accompanying drawing, forming a part of this application, in which:

FIG. 1 is a fragmental, side elevational view, showing the land clearing implement attached to the forward end of a crawler-type tractor unit;

FIG. 2 is a front elevational view of the apparatus shown in FIG. 1, partly broken away;

FIG. 3 is a sectional view taken generally along the line 3—3 of FIG. 2; and,

FIG. 4 is an enlarged, perspective view, partly broken away and in section, showing one of the clearing elements.

Referring now to the drawing for a better understanding of my invention, I show an implement frame generally at 10, which is connected to a tractor indicated at 11 by a suitable linkage 12. Suitable means, not shown, may be employed to raise and lower the implement frame 10 relative to the tractor 11.

The implement frame 10 comprises upper and lower horizontally extending members 13 and 14 which are adapted to extend transversely in front of the tractor unit 11. The upper transverse member 13 is shown as being an angle member while the lower transverse member 14 is shown as being a box-like member. Extending between and connecting the outer ends of the upper and lower transverse members 13 and 14 are side plates 16 and 17. Secured rigidly to the side plate 16 and 17 by top and bottom plates 18 and 19, respectively, are vertical frame members 21, which may be in the form of channel-like members having rearwardly extending legs. As shown in FIG. 1, the implement frame 10 is pivotally connected to the supporting links 12 by suitable pivot pins 22 and 23.

Secured to and extending above the transverse angle member 13 is a superstructure indicated generally at 20, which prevents the falling vegetation from falling rearwardly of the implement frame onto the tractor unit 11 and the operator carried thereby. Suitable gusset plates 24 connect the upper plate members 18 to the superstructure, as shown. Since the superstructure 23 may assume various shapes and sizes, no further description is deemed necessary.

Secured to the transverse members 13 and 14 at laterally spaced intervals are vertically extending rake elements 26. The lower portion of each rake element 26 extends downwardly and forwardly, as shown in FIG. 1, and carries a forwardly extending splitter element 27 at its lower end. Each splitter element 27 is provided with a sharp forward working edge 28 which slopes upwardly and rearwardly, as shown. Also, the forward sides of the splitter element 27 extend downwardly and outwardly as at 29 to facilitate penetration of the splitter element into a tree stump or the like.

As shown in FIGS. 2 and 3, a shear blade 31 is provided adjacent one side of each of the splitter elements 27. The shear blade 31 is provided with a working edge 32, which extends forwardly and inwardly relative to the splitter element 27 in a generally horizontal plane to a point adjacent the forward end of the splitter element 27. A shear blade 33 is provided at the opposite side of each splitter element 27 from the shear blades 31 and is provided with a working edge 34 which extends forwardly and inwardly relative to the splitter element 27 in a generally horizontal plane. The forward end of the shear blade 33 terminates rearwardly of the forward end of the shear blade 31 in position for the splitter element 27 and a forward portion of the first shear blade 31 to split and shear off a portion of an object before the shear blade 33 contacts the object. As clearly shown in FIG. 2, the edges of adjacent ones of the shear blades 31 and 33 overlap each other, as viewed in the direction of travel of the blades. Accordingly, an object engaged by the shear blade 31 is directed toward the shear blade 33 as the apparatus moves forward. The overlapping relationship between the shear blades, as viewed in the direction of travel, causes all growth, regardless of the smallness of size thereof, to engage at least one of the shear blades.

Secured to each side of each vertically extending rake element 26 is a downwardly and forwardly extending plate-like member 36. The rear, or uppermost portions of each of the plate-like members 36 is secured rigidly to the transverse box member 14. As shown in FIG. 2, the forward edges of the plate-like members 36 converge toward a point intermediate adjacent ones of the rake elements 26 to provide an outwardly flaring recess between each of the adjacent rake elements 26. By providing the outwardly flaring recesses between the rake elements 26 the materials being pushed forward do not become lodged between the rake elements. That is to say, the outwardly flaring recesses between the rake elements 26 provide self-cleaning surfaces which greatly facilitate the separation of the apparatus from the materials being raked forward.

From the foregoing description, the operation of my improved apparatus for clearing land will be readily understood. The frame 10 is connected to the tractor unit 11 whereby it is pushed forward with the splitter elements 27 and the shear blades 31 and 33 adjacent the ground level, as shown in FIGS. 1 and 2. Since the shear blades 31 and 33 extend in a horizontal plane adjacent the surface of the ground, all objects engaged by the shear blades are severed adjacent the ground. As the splitter elements 27 engage objects, such as portions of stumps, or the like, the splitter element and the forward portion of the shear blade 31 split and shear off a portion of the object before the other shear blade 33 contacts the object. That is, by terminating the forward end of the shear blade 33 rearwardly of the forward end of the shear blade 32, the shear blade 33 does not engage the article until the forward portion of the shear blade 31 has moved into the article to shear off a portion thereof. As the apparatus is moved forward relative to the growth, the working edge 32 of the shear blade 31 first engages the growth moving between the adjacent splitter elements. In the event the growth is not completely severed by the time the working edge 34 of the shear blade 33 reaches the growth, it is directed by the shear blade 31 into engagement with the shear blade 33, which completes the severing operation. After the growth has been severed at the ground level, the upwardly and rearwardly extending portions of the rake elements 26 cause the growth to be conveyed upwardly and forwardly as the apparatus is moved forward. It will thus be seen that the apparatus serves not only as a means for cutting the growth at the ground level, but also as a means for raking the growth forward after it has been cut.

From the foregoing, it will be seen that I have devised an improved land clearing implement which is particularly adapted for removing all small growth by one pass of the apparatus over a given area. By providing a plurality of laterally spaced splitter elements in combination with shear blades adjacent opposite sides thereof which are disposed to sever completely any growth directed between the splitter elements, the growth is removed in an efficient manner, thus eliminating the necessity of having to bring in hand labor to hunt out and remove small growth. Also, by providing working edges on the shear blades which are in overlapping relationship with each other, as viewed in the direction of travel, each object directed between adjacent splitter elements is engaged by at least one of the shear blades whereby it is cut at the ground level. Also, by providing a splitter element in combination with the shear blades, the apparatus is adapted to cut up and remove stump-like objects, as well as small growth. Furthermore, by providing vertically extending rake elements, which extend downwardly and forwardly of the implement frame, together with outwardly flaring recesses between adjacent rake elements, the growth is pushed upwardly and forwardly with a minimum of effort and without causing the growth to become lodged within the apparatus.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:
1. A land clearing implement comprising:
   (a) a movable frame,
   (b) a plurality of forwardly extending splitter elements carried by said movable frame and spaced laterally from each other,
   (c) a first shear blade mounted adjacent one side of each splitter element and extending forwardly and inwardly relative thereto in a generally horizontal plane to a point adjacent the forward end of said splitter element,
   (d) a second shear blade mounted at the opposite side of each splitter element from said first shear blade and extending forwardly and inwardly relative thereto in a generally horizontal plane with the forward end of said second shear blade terminating rearwardly of the forward end of said first shear blade in position for the splitter element and a forward position of said first shear blade to split and shear off a portion of an object before said second shear blade contacts said object,
   (e) the edges of adjacent ones of said first and second shear blades being in overlapping relationship with each other as viewed in the direction of travel with the edge of said first shear blade extending rearwardly toward the adjacent edge of said second shear blade to direct an object engaged by said first shear blade toward said second shear blade adjacent thereto.

2. A land clearing implement as defined in claim 1 in which the forward edge of each splitter element extends upwardly and rearwardly.

References Cited

UNITED STATES PATENTS

| | | | |
|---|---|---|---|
| 2,615,262 | 10/1952 | Reid | 144—34.6 |
| 2,735,197 | 2/1956 | Struemph | 37—145 |
| 2,856,708 | 10/1958 | Schnore | 37—145 |
| 3,119,421 | 1/1964 | Marine | 144—34.6 |

ANTONIO F. GUIDA, *Primary Examiner.*

U.S. Cl. X.R.

37—2; 56—229